(12) United States Patent
Joerg et al.

(10) Patent No.: US 12,218,552 B2
(45) Date of Patent: Feb. 4, 2025

(54) SENSOR ARRANGEMENT AND METHOD FOR JOINING A SENSOR ARRANGEMENT OF THIS KIND

(71) Applicant: Robert Bosch GmbH, Stuttgart (DE)

(72) Inventors: Martin Joerg, Wertach (DE); Dietmar Hofmann, Blaichach (DE); Peter Bigl, Fischen (DE)

(73) Assignee: Robert Bosch GmbH, Stuttgart (DE)

( * ) Notice: Subject to any disclaimer, the term of this patent is extended or adjusted under 35 U.S.C. 154(b) by 472 days.

(21) Appl. No.: 17/621,609

(22) PCT Filed: Apr. 28, 2020

(86) PCT No.: PCT/EP2020/061698
§ 371 (c)(1),
(2) Date: Dec. 21, 2021

(87) PCT Pub. No.: WO2021/004669
PCT Pub. Date: Jan. 14, 2021

(65) Prior Publication Data
US 2022/0355777 A1     Nov. 10, 2022

(30) Foreign Application Priority Data

Jul. 9, 2019   (DE) ..................... 10 2019 210 065.1

(51) Int. Cl.
*H02K 11/215*     (2016.01)
*B60T 8/36*       (2006.01)
(Continued)

(52) U.S. Cl.
CPC ............ *H02K 11/215* (2016.01); *B60T 8/368* (2013.01); *B60T 13/662* (2013.01); *G01D 5/145* (2013.01);
(Continued)

(58) Field of Classification Search
CPC ... H02K 11/215; H02K 11/0141; B60T 8/368; B60T 13/662; B60T 2270/30; G01D 5/145; G01D 11/245
(Continued)

(56) References Cited

U.S. PATENT DOCUMENTS

| 2018/0269751 A1 | 9/2018 | Foerch |
| 2019/0140523 A1 | 5/2019 | Schlitzkus et al. |

FOREIGN PATENT DOCUMENTS

| DE | 10 2011 089 667 A1 | 6/2013 |
| DE | 10 2015 201 411 A1 | 7/2016 |

(Continued)

OTHER PUBLICATIONS

International Search Report corresponding to PCT Application No. PCT/EP2020/061698, mailed Jul. 29, 2020 (German and English language document) (5 pages).

*Primary Examiner* — Robert R Raevis
(74) *Attorney, Agent, or Firm* — Maginot, Moore & Beck LLP

(57) ABSTRACT

As is further apparent from FIGS. 1 to 4, the illustrated exemplary embodiment of the measuring apparatus 10 comprises a second housing 12 and a metal shielding plate 14 that encompasses the second housing 12. In so doing, the metal shielding plate 14 is formed in a closed manner and pushed over the second housing 12. The second housing 12 is formed in the illustrated exemplary embodiment as a synthetic material housing. The measuring element 16.2 is formed in the illustrated embodiment as a TMR component 16.2A that is based on the TMR effect (tunnel magnetoresistive effect) and cooperates with the permanent magnet 22 that is arranged on the end of the shaft 26A of the brushless EC motor in order to detect the prevailing rotational position of the shaft 26A. It is naturally also possible to use other measuring elements 16.2 that are suitable to (Continued)

detect the prevailing rotational position of the shaft. In the illustrated exemplary embodiment of the measuring apparatus 10, a sensor electronic system 16 comprises in addition to the measuring element 16.2 a circuit board 16.1 on which is positioned and fastened the measuring element 16.2, and multiple current rails 16.3 are pressed into the circuit board [16] 16.1 and held in position by the second housing 12. As a consequence, the rotational position signal that is detected by the measuring element 16.2 is transmitted by way of the circuit board 16 and the current rails 16.3 to a (not illustrated) control device.

20 Claims, 5 Drawing Sheets

(51) Int. Cl.
  *B60T 13/66* (2006.01)
  *G01D 5/14* (2006.01)
  *G01D 11/24* (2006.01)
  *H02K 11/01* (2016.01)

(52) U.S. Cl.
  CPC ........ *G01D 11/245* (2013.01); *H02K 11/0141* (2020.08); *B60T 2270/30* (2013.01)

(58) Field of Classification Search
  USPC ................................. 73/519.01, 488, 432.1; 324/207.11–207.25, 226, 227; 318/647, 318/651–653, 400.38, 400.39; 417/18, 25
  See application file for complete search history.

(56) References Cited

FOREIGN PATENT DOCUMENTS

| | | |
|---|---|---|
| DE | 10 2016 207 659 A1 | 11/2017 |
| DE | 10 2016 211 422 A1 | 12/2017 |
| DE | 10 2017 218 648 A1 | 4/2019 |
| EP | 1 562 030 A2 | 8/2005 |
| JP | 2008-542756 A | 11/2008 |
| JP | 2013-71491 A | 4/2013 |
| JP | 2018-506957 A | 3/2018 |
| JP | WO2018/074549 A1 | 4/2018 |
| JP | 2019-77436 A | 5/2019 |
| JP | 2020048351 A * | 3/2020 ........... B62D 5/0403 |

* cited by examiner

SENSOR ARRANGEMENT AND METHOD FOR JOINING A SENSOR ARRANGEMENT OF THIS KIND

This application is a 35 U.S.C. § 371 National Stage Application of PCT/EP2020/061698, filed on Apr. 28, 2020, which claims the benefit of priority to Serial No. DE 10 2019 210 065.1, filed on Jul. 9, 2019 in Germany, the disclosures of which are incorporated herein by reference in their entirety.

The disclosure relates to a sensor arrangement for detecting a movement of a body that is movably mounted within a first housing and a method for joining such a sensor arrangement. Subject matter of the present disclosure is also an ESP system (ESP: electronic stability program) for a vehicle having such a sensor arrangement.

In the case of an improved ESP system, a brushless DC motor that is also described as a brushless EC motor (electronically commutated motor) is to be used in lieu of a simple DC motor. When controlled correctly, this achieves higher rotational speeds with the result that the braking pressure in the vehicle can be built up quicker, which in the end effect leads to a shortening of the braking distance. In order to activate the motor at the correct point in time, a sensor arrangement is installed, which recognizes the prevailing rotational position of the motor and transmits this position to a control device. For this purpose, a transducer that is designed as a permanent magnet is positioned extremely precisely and permanently fixed for example on a free end of a motor shaft and the field lines of said transducer run through a measuring element of a measuring apparatus that is mounted on a pump housing. The measuring apparatus comprises a synthetic material housing and a sensor element that is based for example on the TMR effect (tunnel magneto-resistive effect) and detects the angle of the magnetic field lines. In order to be able to detect these magnetic field lines as precisely as possible, the measuring element or the complete measuring apparatus should be positioned very precisely with respect to the transducer on the motor shaft or with respect to the motor hole of the pump housing. In addition, the motor hole through which brake fluid can leak during the operation of the system should be permanently closed and sealed to prevent such leakage.

A motor pump assembly for a brake system, having an electric motor that comprises a motor shaft is known from DE 10 2015 201 411 A1. The motor shaft drives at least one fluid pump that is arranged in a pump housing. In so doing, a control device is arranged on the pump housing and adjusts a current rotational speed and/or a current torque of the electric motor, wherein the control device detects a prevailing angle of rotation of the motor shaft in a contactless manner by way of a sensor arrangement, which comprises a magnetic transducer and a measuring element, and evaluates the measured value so as to actuate the electric motor. The transducer is arranged on a free end of the motor shaft within the pump housing and in dependence upon the rotational movement of the motor shaft influences at least one magnetic variable of a magnetic field that is detected by the magnetic measuring element, which is arranged in a fixed manner in the control device or sensor.

An actuator facility for a vehicle, in particular for a brake system of a motor vehicle, having at least one electronically commutated electric motor, which comprises a rotor that is non-rotatably arranged on a rotatably mounted shaft, and having at least one angle of rotation sensor for detecting a rotational position of the rotor is known from DE 10 2016 207 659 A1. In so doing, the angle of rotation sensor is arranged lying opposite an end side of the shaft. In addition, the end or the end face of the shaft comprises at least one angle of rotation encoder. The angle of rotation encoder can be, for example, a permanent magnet that is fixedly connected to the shaft and consequently rotates therewith. The angle of rotation sensor then detects the magnetic field of the angle of rotation encoder, wherein, in dependence upon the detected magnetic field, the angle of rotation position of the shaft and consequently the position of the rotor is detected or determined.

SUMMARY

The sensor arrangement having the features of the disclosure or the ESP system for a vehicle having the features of the disclosure have in each case the advantage that a connecting adaptor forms an interface between a measuring apparatus and a first housing in which a body is movably mounted and the movement of said body is to be detected and evaluated. It is possible by way of this connecting adaptor, which is produced as a cost-effective individual component, and cost-effective and already known silicone to fix the measuring apparatus in a simple manner on the first housing and to seal the opening in the first housing.

Embodiments of the present disclosure represent a sensor arrangement for detecting in a contactless manner a movement of a body that is movably mounted within a first housing, said sensor arrangement having available a transducer, which is connected in a non-rotatable manner to the body and moves simultaneously with the body, and a fixedly arranged measuring apparatus that encompasses a measuring element. In so doing, in dependence upon the movement of the body, the transducer influences at least one physical variable that is detected by the measuring element. The measuring apparatus is connected by way of a connecting adaptor to the first housing. The connecting adaptor comprises on a side that is facing the first housing a circumferential receiving contour into which a silicone bead is introduced and pressed in between the receiving contour and the first housing, wherein the silicone bead that is pressed in fixes and seals the connecting adaptor on the first housing.

It is preferred that the connecting adapter is designed as a synthetic material injected part. This renders it possible to produce the connecting adapter in a particularly cost-effective manner. In addition, by virtue of such a connecting adapter, there is advantageously no risk of a magnetic short-circuit between a permanent magnet on the moving body and the measuring element.

In addition, an ESP system for a vehicle, having an electric motor for driving at least one pressure generator and such a sensor arrangement is proposed and said sensor arrangement determines a prevailing rotational position and/or rotational speed of a shaft of the electric motor.

Furthermore, a method for joining such a sensor arrangement is proposed, said method comprising the following steps: Providing the first housing having an opening in which the body having the transducer is movably mounted. Providing the measuring apparatus that is connected to the connecting adaptor. Introducing the silicone bead into the circumferential receiving contour of the connecting adaptor. Inserting the tube of the connecting adapter into the opening of the first housing, so that the silicon bead is displaced in the circumferential receiving contour during the insertion procedure and fixes the connecting adapter on the first housing and seals the opening of the first housing.

The term a "measuring apparatus" is understood below to mean an assembly having a measuring element that is preferably based on the TMR effect (tunnel magneto-resistive effect). It is naturally also possible to use measuring elements that are based on another magneto-resistive effect, such as for example the AMR effect (anisotropic magneto-resistive effect), GMR effect (gigantic magneto resistance effect), CMR effect (colossal magneto-resistive effect) etc. In addition, it is possible not only to use the magneto-resistive effect but also to use for example the Hall effect in order to detect the movement of a body. In order to implement the Hall effect, it is possible for example to use a steel disc in lieu of a permanent magnet as the transducer, the movement of which influences at least one physical variable that is detected by Hall elements.

By virtue of the developments and features disclosed in the disclosure, it is possible to achieve advantageous improvements of the sensor arrangement that is disclosed in the disclosure and of the method that is disclosed in the disclosure for joining such a sensor arrangement.

It is particularly advantageous that the connecting adapter can comprise on the side that is facing the first housing a tube that can be inserted into a corresponding opening in the first housing and the transducer that is connected to the moving body is arranged therein. The tube renders it possible to join the connecting adapter in a simple and rapid manner to the first housing.

In a further advantageous embodiment of the sensor arrangement, it is possible to form the circumferential receiving contour in a rotationally symmetrical manner with a cross-section that is curved open at the outer edge of the tube, which is defined by a surface of the first housing. In so doing, the silicone bead that is pressed into the receiving contour seals the connecting adapter and the opening in the first housing. For the purpose of applying the silicone, the receiving contour comprises on the side that is facing the first housing or on the lower side of the connecting adapter preferably a geometry that corresponds to an optimal shape for the application of the silicone and the subsequent displacement of the silicone during the assembly of the measuring apparatus on the first housing. The rotationally symmetrical design of the receiving contour renders it possible to apply the silicone bead in a simple and cost-effective manner since a silicone dispenser that supplies the silicone bead is stationary and the measuring apparatus having the connecting adapter rotates below the dispenser. In addition, the receiving contour that is curved open offers a greater area that can be wetted than for example a flat contour. The open design of the receiving contour renders it possible to apply the silicone in a simple, cost-effective and simultaneously precise manner. Furthermore it is rendered possible to control the applied silicone bead in a fully automated and optical manner, for example with respect to quantity, shape, imperfections etc. Since a corresponding surface of the first housing delimits the open receiving contour in the downwards direction, the silicon is displaced in an advantageous manner horizontally over the surface of the first housing as the components are joined together. As a consequence, it is possible to avoid the opening in the first housing and a motor bearing that is arranged therein being contaminated by the silicone. By applying the silicone to the measuring apparatus or the connecting adapter and not to the first housing, the costs of rejects in the event that the silicone is incorrectly applied are reduced. By virtue of applying the silicone to the connecting adapter and not to the first housing, it is not possible for the silicone to be "stripped off or dragged off" by the tube on the connecting adapter into the opening.

In a further advantageous embodiment of the sensor arrangement, the first housing can comprise a circumferential annular groove that overlaps the receiving contour on the connecting adapter at least in part. The size of the surface of the first housing that is wetted is increased by virtue of the circumferential annular groove. In addition, the silicone is prevented from escaping by way of the external geometry of the connecting adapter. In so doing, a sharp edge at the transition of the annular groove to the flat surface of the first housing is avoided by means of a concave or rounded transition. As a consequence, it is possible to prevent the silicone "sloshing in" as it is displaced, with the result that, by virtue of the concave or rounded transition, the silicone can be displaced without air inclusions. The size of the annular groove can be selected such that any silicone volume that has previously been displaced in the outwards direction can be reliably received in the annular groove. Consequently, it is possible to avoid the silicone wetting the surrounding components.

In a further advantageous embodiment of the sensor arrangement, the receiving contour for receiving the silicone bead in the connecting adapter can comprise for example a receiving space having a first radius that is greater than a cross-section of the silicone bead. This renders it possible for the silicone bead to be received in the receiving space without air inclusions. In addition, the receiving contour for receiving a part of the silicone bead that is pressed in comprises a displacement space having a second radius that is smaller than the first radius of the receiving space. The receiving contour between the receiving space and the displacement space can comprise a tangential and continuously downward route having a curvature that lies opposite with regard to the receiving space and the displacement space and comprises a third radius. It is preferred that the third radius corresponds to the first radius. Furthermore, the receiving contour can comprise an outlet at an edge of the displacement space that is remote from the receiving space. In so doing, the circumferential annular groove in the first housing can overlap the receiving contour at the connecting adapter at least in the region of the displacement space in order to receive parts of the displaced silicone. The design of such a receiving contour in a synthetic material injection method is possible in a simple open/close tool without a slider. In so doing, it is possible for the smaller second radius of the displacement space of the receiving contour to correspond approximately to half of the first radius. This renders possible a tolerance compensation of the applied quantity of silicone. By virtue of the tangential and continuously downward route between the receiving space and the displacement space, the receiving contour is wetted in a uniform continuous manner without air inclusions. In contrast thereto, an upward route for example would promote air inclusions. The outlet can be formed for example by a gap that is created by contact areas on the connecting adapter relative to the first housing and it renders possible an additional tolerance compensation and ventilation during the assembly procedure. In addition, the ventilation renders possible a shortest possible process time since a "waiting time" for the pressure buildup is not required. Furthermore, in order to avoid air inclusions it is possible to design all the transitions without undercuts or inclining areas.

In a further advantageous embodiment of the sensor arrangement, the transducer can comprise a permanent magnet and the measuring element can detect at least one magnetic variable of a magnetic field of the permanent magnet that is influenced by the movement of the body. In so doing, the permanent magnet can be injected for example in the form of a synthetic material bonded permanent magnetic material as an extension onto the body with the result that a free end of the body forms the permanent magnet. Alternatively, the permanent magnet can be adhered by means of a thermal hardening adhesive material in a retaining vessel, which can be pressed in and permanently fastened by way of at least one press-in pin in corresponding holes in the body. The moving body can be designed for example as a rotationally movably mounted shaft or as a translationally movably mounted rod. In so doing, in the case of the body that is designed as a shaft, it is possible to evaluate the influence of the magnetic field that is detected by the measuring element in order to calculate a current angle of rotation and/or a current rotational speed of the shaft. In the case of the body that is designed as a rod, it is possible to evaluate the influence of the magnetic field that is detected by the measuring element in order to calculate a currently covered distance and/or a current displacement speed of the rod.

In a further advantageous embodiment of the sensor arrangement, it is possible to form at least one press-in rib, which extends in the axial direction, on an outer wall of the tube and by means of said press-in rib the tube can be pressed into the opening and pre-fixed. In order to facilitate the insertion of the tube into the opening, it was possible to form on the end of the at least one press-in rib an insertion incline. In addition, it is possible to form an insertion chamfer on the edge of the opening. It is preferred that multiple press-in ribs can be arranged distributed on the outer wall of the tube and the tube can be centered in the opening in the first housing. As a consequence, the measuring apparatus or the measuring element can be orientated in the direction of the opening in the first housing and positioned in an optimal manner. By virtue of the press-in ribs, the measuring apparatus or the measuring element is fixed and positioned until the silicone bead has completely hardened. In the subsequent operation, if the excess pressure under high temperature is relaxed, the silicone bead that is pressed in and hardened can assume the exclusive function of fixing the measuring apparatus and also the general sealing of the opening in the first housing with respect to fluid. In addition, by virtue of the press-in ribs, corresponding gaps for ventilation are provided which are useful as the measuring apparatus or the connecting adapter is pressed into the opening in the first housing. The ventilation renders possible a shortest possible process time since a "waiting time" for the pressure buildup is not involved. The press-in ribs render it possible to center and temporarily fasten the measuring apparatus without undercuts on the connecting adapter and/or in the opening of the first housing. It is therefore possible to produce the connecting adapter as a synthetic material injection part by a simple open-close tool without a slider.

In a further advantageous embodiment of the sensor arrangement, the connecting adapter can comprise on the outer periphery at least one recess for engaging a positioning tool and/or gripping tool. It is preferred that the connecting adapter comprises two V-shaped recesses that are formed lying opposite one another on the outer periphery. This renders it possible for the connecting adapter to be repeatedly and precisely gripped during various manufacturing steps and for the measuring apparatus to be positioned in a very precise rotational manner in the opening of the first housing during the final assembly procedure.

In a further advantageous embodiment of the sensor arrangement, the connecting adapter can comprise on an end side that is facing the measuring apparatus multiple surfaces for engaging a press-in tool and on the end side that is facing the first housing multiple contact areas against which the connecting adapter can lie on the first housing. In so doing, the support surfaces and the contact areas can be arranged lying opposite one another.

In a further advantageous embodiment of the sensor arrangement, a metal shielding plate can be pushed over a second housing of the measuring apparatus and encompass the second housing. As a consequence, the sensor electronic system can be shielded against electromagnetic interference fields all around the measuring apparatus. As a consequence, a falsification of the detected magnetic variable can be made at least difficult or can be avoided.

It in a further advantageous embodiment of the sensor arrangement, the measuring element can be positioned on a circuit board and fastened. In so doing, the connecting adapter can comprise for example on a side that is facing the measuring apparatus at least one press-in pin that can be pressed into a corresponding opening of the circuit board. It is preferred that it is possible to form multiple press-in pins distributed on the connecting adapter and said multiple press-in pins position and center the circuit board having the measuring element with regard to the opening in the first housing. As a consequence, the circuit board together with the measuring element can be received in the axial and radial direction in an extremely precise manner in the measuring apparatus and the measuring element can be positioned in an optimal manner in the direction of the first housing.

In a further advantageous embodiment of the sensor arrangement, the metal shielding plate, the second housing, the circuit board and the at least one press-in pin of the connecting adapter can be connected to one another by way of at least one adhesive connection.

In a further advantageous embodiment of the method, the tube of the connecting adapter can be pressed by way of multiple press-in ribs that are arranged on its outer wall into the opening and centered and pre-fixed during the hardening procedure of the silicone bead that is pressed in. As a consequence, the measuring apparatus can be fixed and positioned until the silicone bead has completely hardened.

Exemplary embodiments of the disclosure are illustrated in the drawing and are further explained in the description below. In the drawing, like reference numerals describe components or elements that perform like or similar functions.

DETAILED DESCRIPTION

Figure 1:
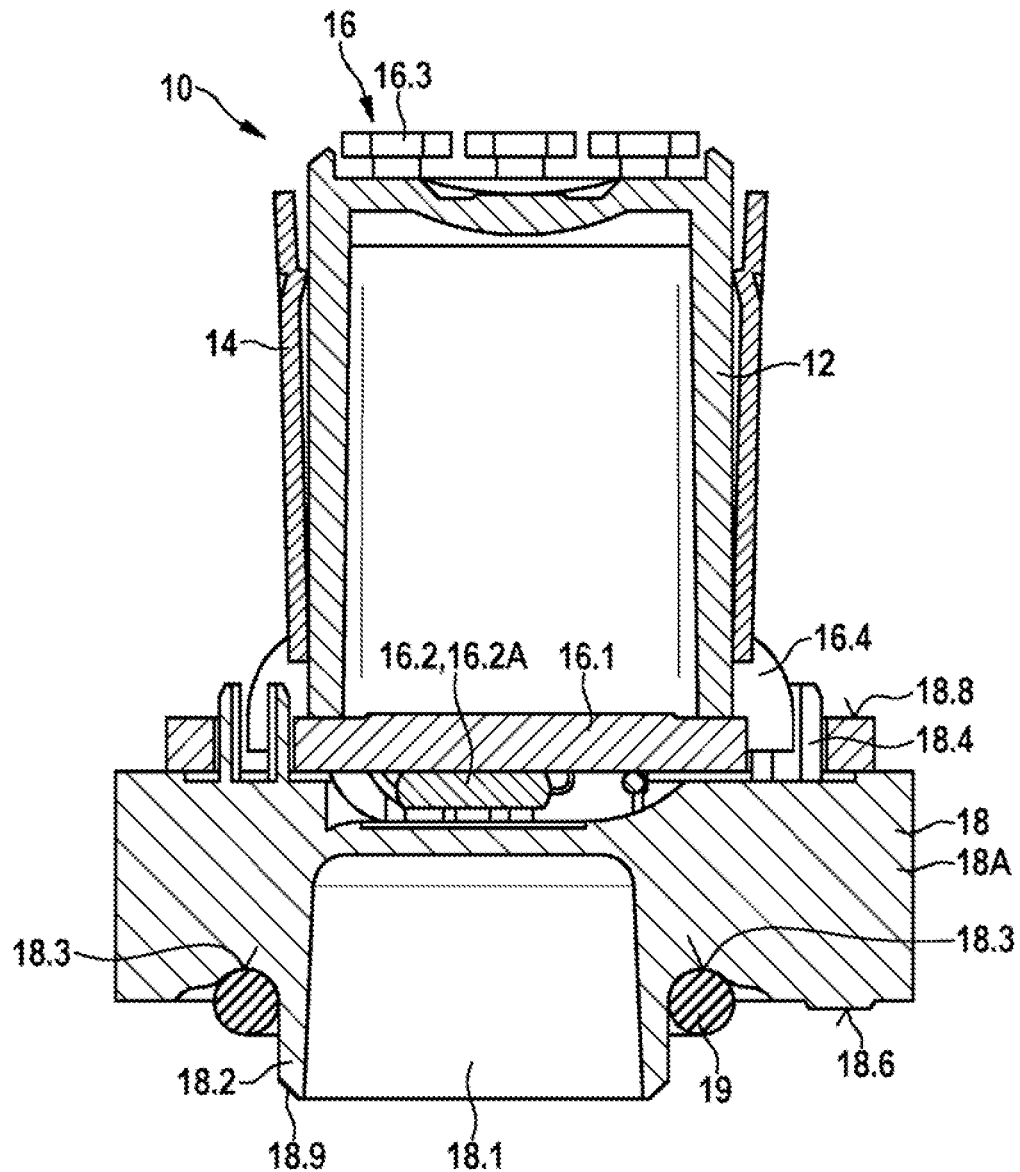
FIG. 1 illustrates a schematic sectional view of an exemplary embodiment of a measuring apparatus of a sensor arrangement in accordance with the disclosure for detecting a movement of a body that is movably mounted within a first housing prior to joining to a first housing.

As is apparent from FIGS. 1 to 5, the illustrated exemplary embodiment of a sensor arrangement 1 in accordance with the disclosure for the contactless detection of a movement of a body 26 that is movably mounted within a first housing 3 comprises a transducer 20, which is non-rotatably connected to the body 26 and moves simultaneously with the body 26, and a measuring apparatus 10 that is fixedly arranged and comprises a measuring element 16.2. In dependence upon the movement of the body 26, the transducer 20 influences at least one physical variable that is detected by the measuring element 16.2. In so doing, the measuring apparatus 10 is connected to the first housing 3 by way of a connecting adapter 18 that is designed in the illustrated embodiment as a synthetic material injection part 18A. The connecting adapter 18 comprises on a side that is facing the first housing 3 a circumferential receiving contour 18.3 in which a silicone bead 19 is inserted and pressed between the receiving contour 18.3 and the first housing 3, wherein the silicone bead 19A that is pressed in fixes and seals the connecting adapter 18 on the first housing 3.

As is further apparent from FIGS. 1 to 5, the connecting adapter 18 in the illustrated exemplary embodiment comprises on the side that is facing the first housing 3 a tube 18.1 that can be inserted into a corresponding opening 5 in the first housing 3 and the transducer 20 that is connected to the moving body 26 is arranged in said corresponding opening. The circumferential receiving contour 18.3 is formed in a rotationally symmetrical manner with a cross-section that is curved open on the outer edge of the tube 18.1. As is further apparent from FIGS. 4 and 5, the open cross-section of the receiving contour is defined by a surface of the first housing 3, wherein the silicone bead 19A that is pressed into the receiving contour 18.3 seals the connecting adapter 18 and the opening 5 in the first housing 3.

Figure 4:
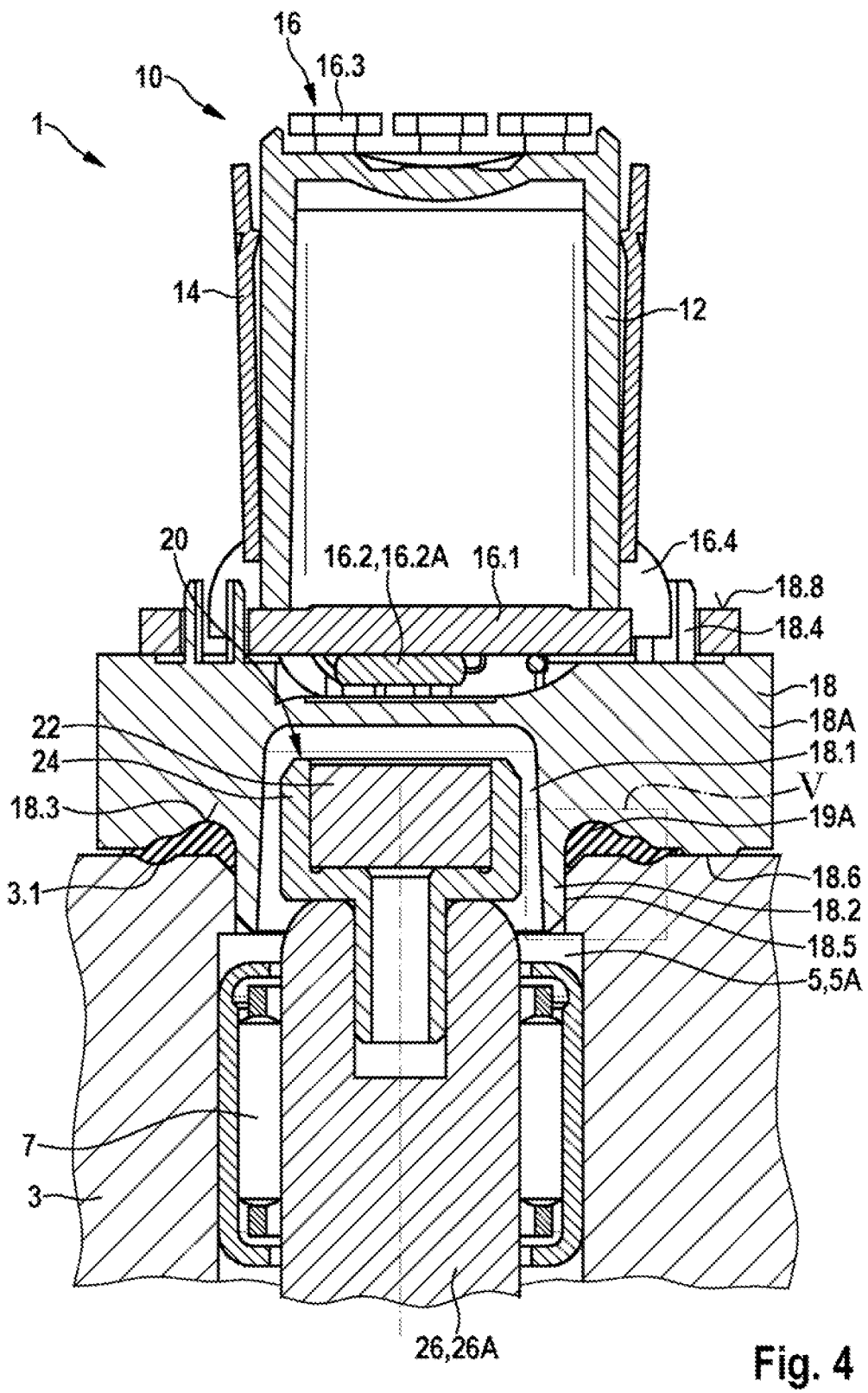
FIG. 4 illustrates a schematic sectional view of an exemplary embodiment of a sensor arrangement in accordance with the disclosure for detecting a movement of a body that is movably mounted within a first housing.

As is further apparent from FIG. 4, in the illustrated exemplary embodiment the sensor arrangement 1 in accordance with the disclosure is used in an ESP system in order to determine a prevailing rotational position and/or rotational speed of a shaft 26A of an electric motor that is used for driving at least one pressure generator. In so doing, the first housing 3 in the illustrated exemplary embodiment is formed by a pump housing 3A of the ESP system which in addition to the electric motor, which is designed by way of example as a rotational speed controlled brushless EC motor (electronically commutated motor), comprises multiple (not further illustrated) fluid pumps, spring pressure storage devices and fluid channels and also solenoid valves and pressure sensors. The moving body 26 in the illustrated exemplary embodiment is therefore designed as a rotationally movably mounted shaft 26A on the free end of which is arranged a permanent magnet 22. As is further apparent from FIG. 4, the shaft 26A of the electric motor is mounted by way of a motor bearing 7 in a rotationally movable manner in the opening 5 that is provided as a motor hole 5A in the pump housing 3A. In so doing, the measuring element 16.2 in the illustrated exemplary embodiment comprises at least one magnetic variable of a magnetic field of the permanent magnet 22 that is influenced by the movement of the body 26. In the case of the body 26 that is designed as the shaft 26A, it is possible to evaluate the influence of the magnetic field that is detected by the measuring elements 16.2 in order to calculate a current angle of rotation and/or a current rotational speed of the shaft 26A. In the case of an alternative (not illustrated) exemplary embodiment, the moving body 26 is designed as a translationally mounted rod. In so doing, in the case of the body 26 that is designed as a rod it is possible to evaluate the influence of the magnetic field that is detected by the measuring element 16.2 in order to calculate a currently covered distance and/or a current displacement speed of the rod.

As is further apparent from FIG. 4, the permanent magnet 22 is adhered in a retaining vessel 24, which is produced from a non-magnetic material, for fastening to the shaft 26 in the illustrated exemplary embodiment. In so doing, the permanent magnet 22 is positioned and permanently fastened in a very precise manner on the shaft 26A. In so doing, the shaft 26A comprises an end-side hole for receiving a press-in pin of the retaining vessel 24 with the result that the retaining vessel 24 can be permanently fastened to the shaft 26A. The base of the vessel serves as a magnetic isolation layer between the permanent magnet 22 and the soft-magnetic shaft 26A. As a consequence, the amount of useful magnetic field that drains into the shaft 26A is reduced. In the case of an alternative (not illustrated) exemplary embodiment, the permanent magnet is injected in the form of a synthetic material-bonded permanent magnetic material as an extension onto the body 26 with the result that a free end of the body 26 forms the permanent Magnet 22.

As is further apparent from FIGS. 1 to 5, multiple press-in ribs 18.2 that extend in the axial direction are distributed on an outer wall of the tube 18.1 and this centers the tube 18.1 in the opening 5 in the first housing 3.

In addition, the tube 18.1 can be pressed into the opening 5 or the motor hole 5A and pre-fixed by way of the multiple press-in ribs 18.2. In order to facilitate the insertion of the tube 18.1 into the opening 5, in the illustrated exemplary embodiments in each case an insertion incline 18.9 is formed at the end of multiple press-in ribs 18.2. In addition, an insertion chamfer 3.3 is formed on the edge of the opening 5.

Figure 2:
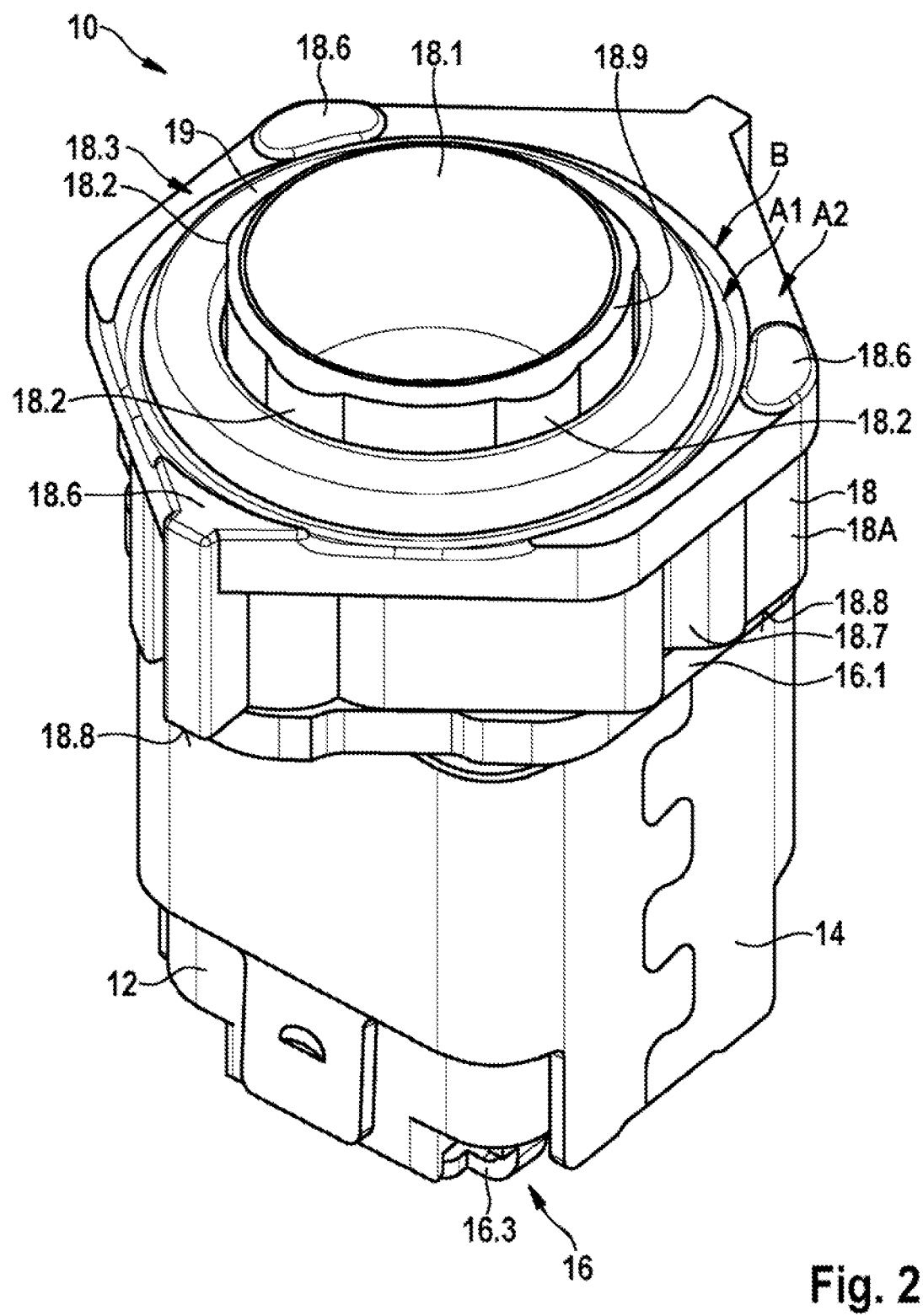
FIG. 2 illustrates a schematic perspective view of the measuring apparatus shown in FIG. 1 from below.
Figure 3:
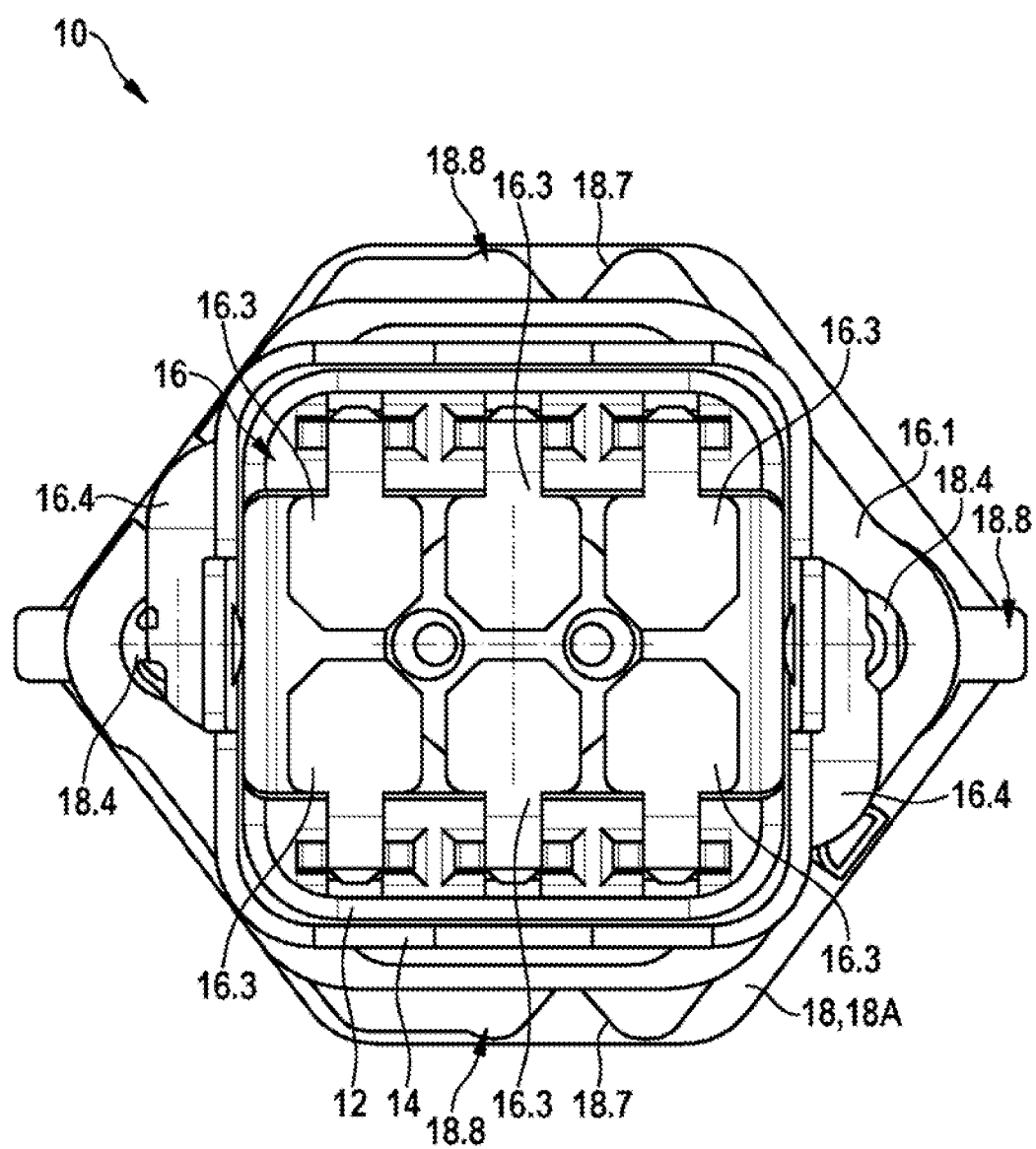
FIG. 3 illustrates a schematic plan view of the measuring apparatus shown in FIGS. 1 and 2.

As is apparent in particular from FIGS. 2 and 3, the connecting adapter 18 in the illustrated exemplary embodiment comprises on the outer periphery two V-shaped recesses 18.7 for engaging a positioning tool and/or gripping tool. The two V-shaped recesses 18.7 are formed lying opposite one another on the outer periphery of the connecting adapter 18. The recesses 18.7 render it possible during various manufacturing steps to repeatedly and precisely grip the connecting adapter 18 and for the measuring apparatus 10 to be positioned in a very precise rotational manner in the opening 5 of the first housing 3 during the final assembly procedure.

As is further apparent from FIGS. 1 to 5, the connecting adapter 18 comprises on an end side that is facing the measuring apparatus 10 three support surfaces 18.8 for engaging a press-in tool. The connecting adapter 18 comprises on the end side that is facing the first housing 3 three contact areas 18.6 against which the connecting adapter 18 lies on the first housing 3. In so doing, the support surfaces 18.8 and the contact areas 18.6 are arranged lying opposite one another. It is naturally also possible to provide more than three support surfaces 18.8 or contact areas 18.6.

In addition, the circumferential receiving contour 18.3 in the illustrated exemplary embodiment comprises for receiving the silicone bead 19 a receiving space A having a first radius R1 that is larger than a cross-section of the silicone bead 19. Furthermore the receiving contour 18.3 for receiving a part of the silicone bead 19A that is pressed in comprises a displacement space B having a second radius R2 that is smaller than the first radius R1 of the receiving space A. In the illustrated exemplary embodiment, the second radius R2 corresponds approximately to half of the first radius R1. As is further apparent in particular from FIGS. 2, 4 and 5, the receiving contour 18.3 comprises between the receiving space A and the displacement space B a tangential and continuously downward route A1 having a curvature that lies opposite with regard to the receiving space A and the displacement space B. In addition, the route A1 comprises a third radius R3 that is equal to the first radius R1. As is further apparent from FIGS. 2, 4 and 5, the receiving contour 18.3 comprises an outlet A2 on an edge of the displacement space B that is remote from the receiving space A. The outlet A2 in the illustrated exemplary embodiment is formed by a gap that is produced by the contact areas 18.6 on the connecting adapter 18 between the connecting adapter 18 and the first housing 3. This renders it possible to perform an additional tolerance compensation and ventilation during the assembly procedure.

Above all, the geometric design of the receiving contour 18.3 renders it possible by way of multiple radii R1, R2, R3 for the silicone bead 19A that is pressed in to lie cleanly against the surface of the first housing 3 and in the receiving contour 18.3 of the connecting adapter 18. As a consequence, it is possible for example to reduce imperfections and air inclusions within the silicone seal with the aim of completely and uniformly wetting the surface of the first housing 3 and the receiving contour 18.3. Furthermore, the design creates a larger volume and consequently an advantageous tolerance compensation of the quantity of silicone that is applied. In so doing, the silicone bead 19 is introduced into the deeper receiving space A of the receiving contour 18.3. As the tube 18.1 is pressed into the opening 5 of the first housing 3, the silicone bead 19 that is introduced is displaced by way of the route A1 into the flatter displacement space B and the outlet A2 of the receiving contour 18.3 and thus pressed between the receiving contour 18.3 and the surface of the first housing 3.

Figure 5:
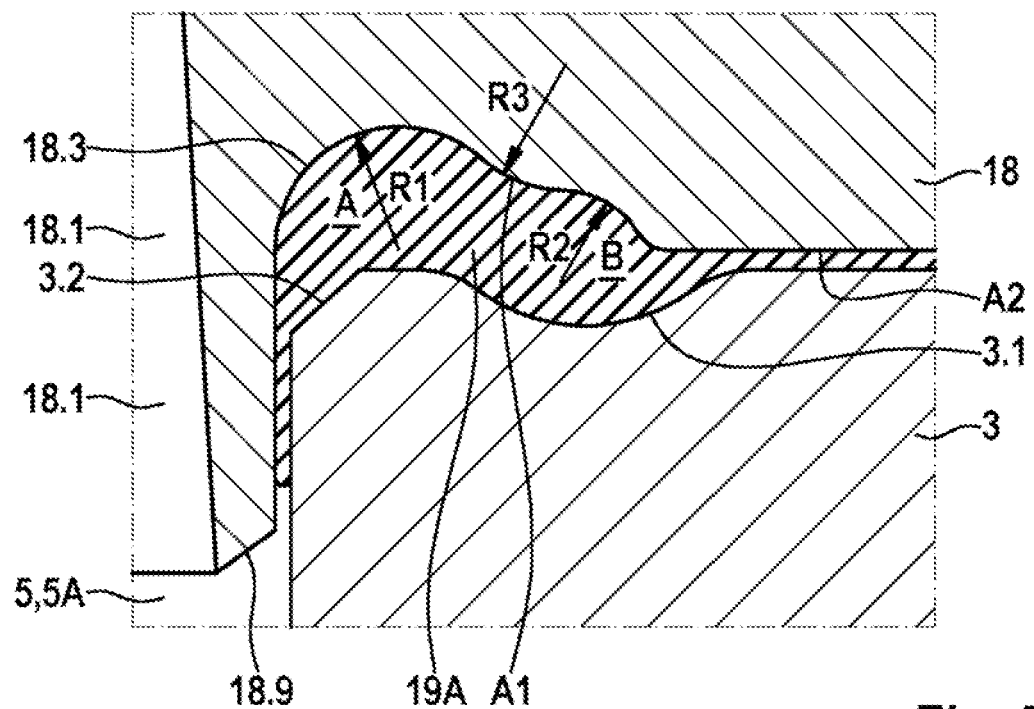
FIG. 5 illustrates a view of a detail V of the measuring apparatus shown in FIG. 4.

As is further apparent from FIGS. 4 and 5, the first housing 3 in the illustrated exemplary embodiment of the sensor arrangement 1 comprises a circumferential annular groove 3.1 which overlaps the receiving contour 18.3 on the connecting adapter 18 at least in part. In the illustrated exemplary embodiment, the circumferential annular groove 3.1 in the first housing 3 overlaps the receiving contour 18.3 on the connecting adapter 18 in the region of the displacement space B and the outlet A2 in order to receive parts of the displaced silicone 19A. By virtue of the circumferential annular groove 3.1, the size of the wetted surface of the first housing 3 is increased. As is further apparent in particular from FIG. 5, the annular groove 3.1 comprises a concave or rounded transition to the flat surface of the first housing 3.

As is further apparent from FIGS. 1 to 4, the illustrated exemplary embodiment of the measuring apparatus 10 comprises a second housing 12 and a metal shielding plate 14 that encompasses the second housing 12. In so doing, the metal shielding plate 14 is formed in a closed manner and pushed over the second housing 12. The second housing 12 is formed in the illustrated exemplary embodiment as a synthetic material housing. The measuring element 16.2 is formed in the illustrated embodiment as a TMR component 16.2A that is based on the TMR effect (tunnel magneto-resistive effect) and cooperates with the permanent magnet 22 that is arranged on the end of the shaft 26A of the brushless EC motor in order to detect the prevailing rotational position of the shaft 26A. It is naturally also possible to use other measuring elements 16.2 that are suitable to detect the prevailing rotational position of the shaft. In the illustrated exemplary embodiment of the measuring apparatus 10, a sensor electronic system 16 comprises in addition to the measuring element 16.2 a circuit board 16.1 on which is positioned and fastened the measuring element 16.2, and multiple current rails 16.3 are pressed into the circuit board 16 and held in position by the second housing 12. As a consequence, the rotational position signal that is detected by the measuring element 16.2 is transmitted by way of the circuit board 16 and the current rails 16.3 to a (not illustrated) control device.

As is further apparent from FIGS. 1, 3 and 4, the connecting adapter 18 comprises multiple press-in pins 18.4. In so doing, the circuit board 16.1 is placed on the connecting adapter 18 in such a manner that the press-in pins 18.4 are pressed into corresponding openings of the circuit board 16.1 and position and center the circuit board 16.1 having the measuring element 16.2 with regard to the opening 5 in the first housing 3. As is further apparent from FIG. 4, the tube 18.1 forms a hollow space into which the end of the shaft 26A having the permanent magnet 22 protrudes. In the illustrated exemplary embodiment, the measuring element 16.2 is arranged on a side of the circuit board 16.1 that is facing the shaft 26A or the permanent magnet 22 in a recess of the connecting adapter 18 that is covered by the circuit board 16.1. The (not illustrated) control device can make contact with the current rails 16.3 of the measuring apparatus 10 for example by way of spring contacts.

As is further apparent from FIGS. 1 to 4, a steel metal plate of the metal shielding plate 14 is bent correspondingly to the geometry of the second housing 12, wherein in order to improve the electro-magnetic shielding effect the metal shielding plate 14 is closed all round. In addition, in each case a bending tab which is embossed and exerts a pre-stressing force on the second housing 12 is formed on two opposite-lying sides of the metal shielding plate 14. So as to position the metal shielding plate 14 precisely with respect to the measuring element 16.2, the second housing 12 comprises two opposite-lying bases (not further described) as a stop for the metal shielding plate 14. As a consequence, it is possible to prevent direct contact of the metal shielding plate 14 with the circuit board 16.1 and as a consequence prevent the metal shielding plate 14 chaffing against the circuit board 16.1. Consequently the risk of a short circuit or interruption in the conductive path is also reduced.

As is further evident from FIGS. 1, 3 and 4, the metal shielding plate 14, the second housing 12, the circuit board 16.1 and the press-in pins 18.4 of the connecting adapter 18 are connected to one another by way of multiple adhesive connections 16.4.

Figure 6:
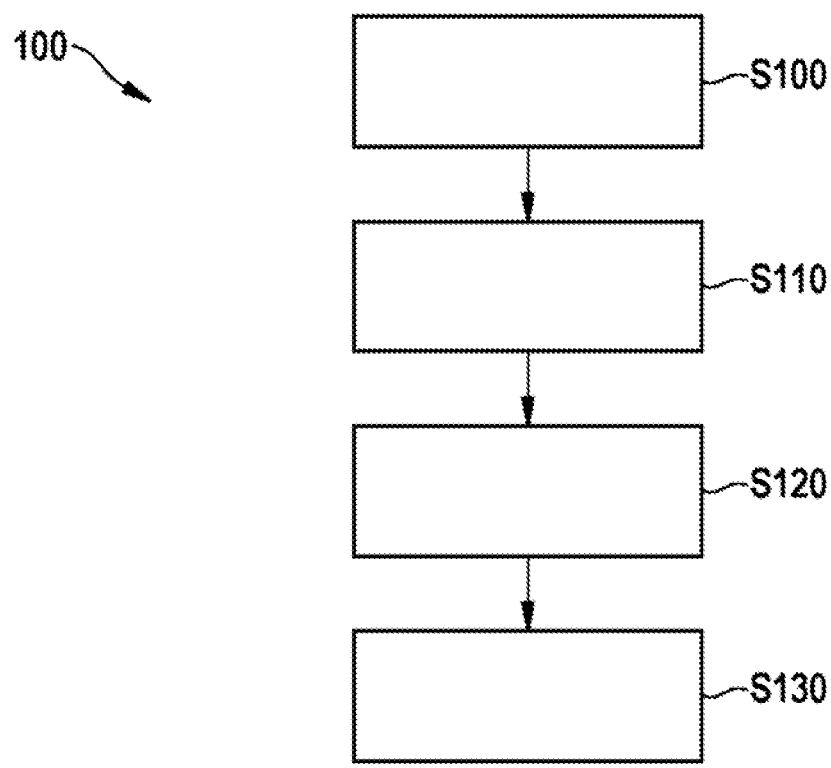
FIG. 6 illustrates a schematic flow diagram of an exemplary embodiment of a method in accordance with the disclosure for joining the sensor arrangement shown in FIGS. 4 and 5.

As is further evident from FIG. 6, in a step S100 the method 100 in accordance with the disclosure for joining a sensor arrangement 1 provides the first housing 3 having the opening 5 or motor hole 5A in which the body 26 or the shaft 26A having the transducer 20 is movably mounted. In the step S110, the measuring apparatus 10 that is connected to the connecting adapter 18 is provided. In so doing, the steps S100 and S110 can be performed in the illustrated sequence or simultaneously or in the reverse sequence. In step S120, the silicone bead 19 is introduced into the circumferential receiving contour 18.3 of the connecting adapter 18. In the step S130, the tube 18.1 of the connecting adapter 18 is inserted into the opening 5 of the first housing 3 in such a manner that during the insertion procedure the silicone bead 19A is displaced in the circumferential receiving contour 18.3 and fixes the connecting adapter 18 on the first housing 3.

After the hardening procedure or activation procedure of the silicone bead 19A that is pressed in, the measuring apparatus 10 is fixed on the housing 3 or the pump housing 3A and seals the opening 5 or the motor hole 5A. The silicone bead 19A that is pressed in can consequently harden for example in the air or in an oven.

The rotationally symmetrical design of the receiving contour 18.3 renders it possible to apply the silicone bead 19 in a simple and cost-effective manner since a (not illustrated) silicone dispenser, which supplies the silicone bead 19, is stationary and the measuring apparatus 10 having the connecting adapter 18 and the receiving contour 18.3 rotates below the dispenser. The open design of the receiving contour 18.3 renders it possible to apply the silicone in a simple, cost-effective and simultaneously precise manner. In addition, it is rendered possible in a fully automated and optical manner to control the silicone bead that has been applied, for example with respect to quantity, shape, imperfections etc. Since a corresponding surface of the first housing 3 delimits the open receiving contour 18.3 in the downwards direction, as the components are joined together the silicone advantageously displaces in the horizontal direction over the surface of the first housing 3. Consequently, it is possible to avoid the opening 5 in the first housing 3 and the motor bearing 7 that is arranged therein being contaminated by the silicone. By virtue of applying the silicone to the measuring apparatus 10 or the connecting adapter 18 and not to the first housing 3, the costs of rejects in the case of incorrectly applied silicone are reduced. In addition, it is not possible for the silicone to be "stripped off or dragged off" by the tube 18.1 on the connecting adapter 18 into the opening 5.

In order to pre-fix the tube 18.1 of the connecting adapter 18 during the hardening procedure or activation procedure of the silicone bead 19A that has been pressed in, the tube 18.1 in the illustrated exemplary embodiment is pressed into the opening 5 and centered by way of multiple press-in ribs 18.2 that are arranged on its outer wall.

The invention claimed is:

1. A sensor arrangement for detecting in a contactless manner a movement of a body that is movably mounted within a first housing, comprising:
   a transducer configured to be non-rotatably connected to the body and to move simultaneously with the body;
   a measuring apparatus that is configured to be fixedly connected to the first housing, and which comprises a measuring element; and
   a silicon bead,
   wherein, the sensor arrangement is configured such that when the body is movably mounted in the first housing and the measuring apparatus is fixedly connected to the first housing,
   the transducer is configured, in dependence upon the movement of the body, to influence at least one physical variable that is detectable by the measuring element,
   the measuring apparatus is fixedly connected to the first housing by a connecting adapter that comprises, on a side that is facing the first housing, a circumferential receiving contour into which the silicone bead is introduced, and
   the silicone bead is pressed in between the receiving contour and the first housing to fix and seal the connecting adapter on the first housing.

2. The sensor arrangement as claimed in claim 1, wherein the connecting adaptor comprises, on a side that is configured to face the first housing when the measuring apparatus is fixedly connected to the first housing:
   a tube, which is configured to be inserted into a corresponding opening in the first housing in which the transducer that is connected to the moving body is arranged when the transducer is non-rotatably connected to the body.

3. The sensor arrangement as claimed in claim 2, the connecting adapter further comprising:
   at least one press-in rib that extends in the axial direction and which is formed on an outer wall of the tube, said at least one press-in rib configured to abut at least one side of the opening when the tube is pressed into in the opening.

4. The sensor arrangement as claimed in claim 3, wherein:
   the at least one press-in rib comprises a plurality of press-in ribs;
   the plurality of press-in ribs are arranged distributed on the outer wall of the tube; and
   said plurality of press-in ribs center the tube in the opening in the first housing when the tube is pressed into in the opening.

5. The sensor arrangement as claimed in claim 2, wherein:
   the circumferential receiving contour is formed in a rotationally symmetrical manner with a cross-section that is curved open on the outer edge of the tube;
   the pressed in silicone bead is positioned on a surface of the first housing when the measuring apparatus is fixedly connected to the first housing; and
   the silicone bead is configured to seal the opening in the first housing when the measuring apparatus is fixedly connected to the first housing.

6. The sensor arrangement as claimed in claim 1, wherein the circumferential receiving contour is configured to overlap a circumferential annular groove of the first housing at least in part when the measuring apparatus is fixedly connected to the first housing.

7. The sensor arrangement as claimed in claim 1, wherein the sensor arrangement is configured such that when the measuring apparatus is fixedly connected to the first housing the circumferential receiving contour defines a portion of a receiving space having a first radius that is greater than a cross-section of the silicone bead.

8. The sensor arrangement as claimed in claim 1, wherein the sensor arrangement is configured such that when the measuring apparatus is fixedly connected to the first housing:
   the circumferential receiving contour defines a portion of a receiving space having a first radius; and
   the circumferential receiving contour defines a portion of a displacement space adjacent to the receiving space having a second radius that is smaller than the first radius of the receiving space.

9. The sensor arrangement as claimed in claim 8, wherein the sensor arrangement is configured such that when the measuring apparatus is fixedly connected to the first housing the circumferential receiving contour defines a portion of a tangential and continuously downward route between the receiving space and the displacement space having a curvature that lies opposite with regard to the receiving space and the displacement space and comprises a third radius.

10. The sensor arrangement as claimed in claim 8, wherein the receiving contour defines in part, at an edge of the displacement space that is remote from the receiving space, an outlet.

11. The sensor arrangement as claimed in claim 8, wherein the sensor arrangement is configured such that when the measuring apparatus is fixedly connected to the first housing:
   the circumferential receiving contour on the connecting adaptor overlaps, at least in part, a circumferential annular groove of the first housing
   at least in a region of the displacement space.

12. The sensor arrangement as claimed in claim 1, wherein:
- the transducer comprises a permanent magnet; and
- the measuring element is configured to detect a variation of a magnetic field of the permanent magnet resulting from movement of the body.

13. The sensor arrangement as claimed in claim 1, wherein the connecting adaptor comprises, on an outer periphery, at least one recess configured to engage at least one of a positioning tool and gripping tool.

14. The sensor arrangement as claimed in claim 1, the connecting adapter comprising:
- a plurality of support surfaces on an end side that is facing the measuring apparatus, the plurality of support surfaces configured to engage a press-in tool; and
- a plurality of contact areas, on an opposite end side that is facing the first housing, when the measuring apparatus is fixedly connected to the first housing, against which the connecting adapter is lying on the first housing, wherein the support surfaces and the contact areas are arranged lying opposite one another.

15. The sensor arrangement as claimed in claim 1, further comprising:
- a metal shielding plate pushed over a second housing of the measuring apparatus and encompassing the second housing.

16. The sensor arrangement as claimed in claim 15, wherein:
- the measuring element is positioned and fastened on a circuit board; and
- the connecting adapter comprises, on a side that is facing the measuring apparatus, at least one press-in pin that is pressed into a corresponding opening of the circuit board.

17. The sensor arrangement as claimed in claim 16, wherein:
- the at least one press-in pin is one of a plurality of press-in pins;
- the plurality of press-in pins are formed distributed on the connecting adapter; and
- said plurality of press-in pins position and center the circuit board having the measuring element with regard to an opening in the first housing, in which the transducer that is connected to the moving body is arranged, when the measuring apparatus is fixedly connected to the first housing.

18. The sensor arrangement as claimed in claim 17, wherein the metal shielding plate, the second housing, the circuit board and the plurality of press-in pins of the connecting adapter are connected to one another by way of at least one adhesive connection.

19. An ESP system for a vehicle, having an electric motor for driving at least one pressure generator and a sensor arrangement, wherein:
- the body that is movably mounted within the first housing is a shaft of the electric motor and the first housing is a housing of the shaft;
- the sensor arrangement is the sensor arrangement as claimed in claim 1; and
- the sensor arrangement is configured to determine at least one of a prevailing rotational position and rotational speed of the shaft of the electric motor.

20. A method for joining a sensor arrangement for detecting in a contactless manner a movement of a body that is movably mounted within a housing, comprising:
- non-rotatably connecting a transducer of the sensor arrangement to the body to move simultaneously with the body, thereby movably mounting the transducer within an opening of the housing;
- providing a measuring apparatus of the sensor arrangement that is connected to a connecting adaptor of the sensor arrangement;
- introducing a silicon bead into a circumferential receiving contour of the connecting adapter; and
- inserting a tube of the connecting adapter into the opening of the first housing, so that the silicon bead is displaced in the circumferential receiving contour during the insertion procedure and fixes the connecting adapter on the first housing and seals the opening of the first housing, and so that a measuring element of the measuring apparatus is positioned to detect at least one physical variable influenced by the transducer in dependence upon movement of the body.

\* \* \* \* \*

UNITED STATES PATENT AND TRADEMARK OFFICE
CERTIFICATE OF CORRECTION

PATENT NO. : 12,218,552 B2
APPLICATION NO. : 17/621609
DATED : February 4, 2025
INVENTOR(S) : Joerg et al.

Page 1 of 1

It is certified that error appears in the above-identified patent and that said Letters Patent is hereby corrected as shown below:

In the Claims

In Claim 20, at Column 14, Lines 33-34: "the opening of the first housing" should read --the opening of the housing--.

Signed and Sealed this
Nineteenth Day of August, 2025

Coke Morgan Stewart
*Acting Director of the United States Patent and Trademark Office*